United States Patent [19]
Shibayama et al.

[11] Patent Number: 5,543,438
[45] Date of Patent: Aug. 6, 1996

[54] PLASTIC FOAM MATERIAL COMPOSED OF A POLYOLEFIN BASED RESIN COMPOSITION AND METHOD FOR MAKING SAME

[75] Inventors: Kouichi Shibayama, Osaka; Masao Suzuki, Shiga-Ken; Masao Ogasa, Osaka; Kenji Iuchi, Kobe, all of Japan

[73] Assignee: Sekisui Chemical Co., Ltd., Osaka, Japan

[21] Appl. No.: 316,566

[22] Filed: Sep. 30, 1994

[51] Int. Cl.$^6$ .................................................... C08L 47/00
[52] U.S. Cl. .............................. 521/140; 521/79; 521/80; 521/134; 521/142; 264/477
[58] Field of Search .................. 521/140, 79, 80, 521/134, 142, 150; 264/22, 27, 3.3, 40.2

[56] References Cited

U.S. PATENT DOCUMENTS

| | | | |
|---|---|---|---|
| 4,252,906 | 2/1981 | Hosokawa et al. | 521/86 |
| 5,075,162 | 12/1991 | Okubo et al. | 428/304.4 |

FOREIGN PATENT DOCUMENTS

| | | |
|---|---|---|
| 0425695 | 5/1991 | European Pat. Off. . |
| 0520773 | 12/1992 | European Pat. Off. . |
| 1219469 | 1/1971 | United Kingdom . |

*Primary Examiner*—Nathan M. Nutter
*Assistant Examiner*—Duc Truong
*Attorney, Agent, or Firm*—Morrison Law Firm

[57] ABSTRACT

A plastic foam material composed of a polyolefin based resin composition, consists essentially of specified amounts of polypropylene based resins and polyethylene based resins, included from about 20 to about 65 weight percent of a cross linked portion. The cross linked portion consists of from about 55 to about 95 weight percent of a cross linked polypropylene and from about 5 to about 45 weight percent of cross linked polyethylene. The amount of cross-linkage can be determined by a xylene extraction technique. The plastic foam material may further include specified amounts of a cross-linking agent and specified amounts of an organic thermodecomposition foaming agent. The thermodecomposition foaming agent decomposes at sufficiently high temperatures to yield a plastic foam material, which exhibits superior adherence properties and fewer deformities of its surface exemplified by swelling, shrinkage and wrinkling of its surface. A method to produce the plastic foam material is also disclosed.

54 Claims, 1 Drawing Sheet

PLASTIC FOAM MATERIAL COMPOSED OF A POLYOLEFIN BASED RESIN COMPOSITION AND METHOD FOR MAKING SAME

BACKGROUND OF THE INVENTION

This invention relates to a plastic foam material. More specifically, this invention is directed to a plastic foam material composed of a polyolefin based resin composition (hereinafter referred to as "plastic foam material") and products derived therefrom. The present invention is also directed to a method of making the plastic foam material.

Due to their superior heat insulating properties, prior art plastic foam material has found widespread use as aircraft, train and automobile components such as panels and seating.

The aforementioned products and interior components can be formed by various means, including vacuum molding, press molding, and similar processes at high temperature. Accordingly, most plastic foam materials composed of a polyolefin based resin contain a polypropylene based resin, which imparts superior heat resistance properties to products derived from the plastic foam material.

Polypropylene based resin and products derived therefrom, however, are plagued by numerous drawbacks. Chief among them is a tendency to deteriorate. This often happens because with polypropylene based resin and derived products, the involved molecular chains are subject to breakage during the foaming process. Such deterioration results from the stresses produced by ionizing radiation, peroxides and similar means.

These stresses on the molecular chains occur during cross-linking and during the foaming process. Such breakage encountered by polypropylene based resins during the foaming process is a problem which has not been adequately addressed in the prior art.

In an attempt to overcome the aforementioned deficiency related to prior art polypropylene based resins and derived products, the use of a polyethylene based resin has been proposed. Employing such a polyethylene based resin was attempted in order to strengthen the resulting products. The goal was to eliminate breakage encountered by polypropylene based resins in making plastic foam materials composed of polyolefin based resins and derived products.

One such method, disclosed in Japanese Laid Open Patent Publication S46-39716, attempts to overcome the numerous disadvantages of prior art plastic foam materials using a method for making plastic foam material composed of polyolefin based resin, which includes a foaming agent. The foaming agent is added after cross-linking the polyolefin based resin sheet with ionizing radiation. However, the moldability of the plastic foam material derived from this process is inadequate.

Similarly, Japanese Laid Open Patent Publication H2-102234 discloses a plastic foam material composed of a polyolefin based resin wherein the resin composition used to form the plastic foam material includes a combination of a polyethylene based resin and a polypropylene based resin. The degree of cross-linkage of the polyethylene based resin is essentially the same as that of the polypropylene based resin.

However, the moldability of the resulting plastic foam material composed of the aforementioned mixed resin composition is severely compromised.

The prior art also shows attempts to improve the moldability of plastic foam materials composed of polyolefin based resins. Japanese Laid Open Patent Publication No. S63-1977 discloses a process wherein the plastic foam material, composed of a polyolefin based resin, is formed from a polyolefin resin in which the degree of cross-linkage in the inner layers is higher than that in the surface layers.

However, the anticipated improvement disclosed in the process of Japanese Laid Open Patent Publication No. S63-1977 does not achieve adequate cross-linkage in the inner layers. Therefore, the improvement in the moldability of the resulting plastic foam material is insufficient.

Generally, polypropylene based cross-linked resin is used in similar ways according to the prior art processes. This includes lining the inside surface of a product with a polypropylene based cross-linked resin by vacuum molding or press forming.

Such surface materials generally include polyvinyl chloride sheets, thermoplastic elastomer sheets, natural or artificial fabrics, leather and similar materials, according to the prior art processes. The temperature for vacuum molding and press forming is generally higher than 160° C.

However, breakage readily occurs due to the mismatch of the elongation rate of the plastic foam material with the elongation rate of the surface material at high temperature. This is because the elongation rate of the plastic foam material at high temperature is considerably slower than that of the surface materials.

Additionally, the resulting plastic foam material is liable to break and disintegrate if its heat-resistance is inadequate. As a result, the top layer of the plastic foam material is liable to peel off, causing the surface layer to swell, which in turn, may allow creases to appear on the surface of the layered body.

Japanese Laid Open Patent Publication No. H2-67129 proposes joining a plastic foam material composed of a polyolefin based resin with its surface material by adjusting the fluidity of the resin. This is done with a view towards solving the above enumerated problems associated with the prior art processes. This fluidity adjustment is done using a polyolefin based resin with a melt index (MI) which falls within a specified range.

The desired MI requires a specific temperature such as 230° C. Japanese Laid Open Patent Publication No. H2-67129 does not disclose good moldability and adherence at other operation temperatures.

The use of a mixed resin composition containing polypropylene based resin and polyethylene based resin has been studied in order to substantially improve heat-resistance of plastic foam :materials composed of a polyolefin based resin.

Japanese Laid Open Patent Publications Nos. S46-38716 and No. S58- 57542 each disclose the use of specific cross-linking agents to achieve better cross-linkage. Similarly, Japanese Laid Open Patent Publication No. S63-1977 discloses use of a specified amount of cross-linkage in an attempt to improve cross-linking in prior art plastic foam materials.

However, none of the prior art references manages to overcome the problem of the compatibility between cross-linking agents and involving specific resin components. Additionally, substantial differences exist between the dispersion of cross-linking agents in each of the various resin components. The difficulty in achieving desired dispersion increases as the degree of cross-linkage between various cross-linking agents and resin components increases.

OBJECTS AND SUMMARY OF THE INVENTION

It is an object of this invention to provide a plastic foam material composed of polyolefin based resin which overcome the deficiencies associated with prior art plastic foam materials.

It is a further object of this invention to provide a method of making the plastic foam material.

It is a further object of this invention to provide a plastic foam material composed of a polyolefin based resin which exhibits superior formability in molding and forming products therefrom.

It is a further object of this invention to provide a plastic foam material composed of polyolefin based resin which exhibits superior adherence to an outer layer of a foreign substrate including a process for making the same.

It is still a further object of this invention to provide a plastic foam material composed of polyolefin based resin which exhibits superior heat resistance.

It is still a further object of this invention to provide a plastic foam material composed of polyolefin based resin which exhibits improved elongation at high temperature.

It is still a further object of this invention to provide a plastic foam material composed of polyolefin based resin which exhibits superior secondary processing properties when it forms a layered structure in conjunction with a substrate.

It is still a further object of this invention to provide a plastic foam material and products derived therefrom which exhibit superior heat-insulating properties that will enable wide use as heat-insulating materials. Based upon their superior heat-insulating properties, products derived from plastic foam materials may be used extensively in many applications in different fields. As such, only representative examples will be describe herein.

It is still a further object of this invention to provide products composed of the plastic foam material of the present invention which are well suited for use as building materials exemplified by ceilings and installment panels.

Briefly stated, the present invention provides a plastic foam material composed of a polyolefin based resin composition, which consists essentially of specified amounts of polypropylene based resins and polyethylene based resins, included from about 20 to about 65 weight percent of a cross linked portion. The cross linked portion consists of from about 55 to about 95 weight percent of a cross linked polypropylene and from about 5 to about 45 weight percent of cross linked polyethylene. The amount of cross-linkage can be determined by a xylene extraction technique. The plastic foam material may further include specified amounts of a cross-linking agent and specified amounts of an organic thermodecomposition foaming agent.

The thermodecomposition foaming agent decomposes at sufficiently high temperatures to yield a plastic foam material, which exhibits superior adherence properties and fewer deformities of its surface exemplified by swelling, shrinkage and wrinkling of its surface. A method to produce the plastic foam material is also disclosed.

According to an embodiment of the invention, there is provided a plastic foam material consisting of an polyolefin based resin composition comprising, from about 40 to about 95 weight percent of polypropylene based resins, from about 5 to about 60 weight percent of polyethylene based resins.

The plastic foam material includes from about 20 to about 65 weight percent of a cross linked portion, and the cross linked portion consists includes from about 55 to about 95 weight percent of a cross linked polypropylene and from about 5 to about 45 weight percent of cross linked polyethylene.

According to a feature of the invention, there is provided a plastic foam material comprising a polyolefin based resin composition comprising from about 40 to about 95 weight percent of polypropylene based resin containing from about 2 to about 15 weight percent of ethylene, from about 5 to about 60 weight percent of a polyethylene based resin; the plastic foam material further includes from about 20 to about 65 weight percent of a cross linked portion, the cross linked portion consists of from about 55 to about 95 weight percent of a cross linked polypropylene and from about 5 to about 45 weight percent of cross linked polyethylene.

According to a feature of the invention, there is provided a method for preparing a plastic foam material comprising the steps of mixing from about 40 to about 95 weight percent of polypropylene based resins and from about 5 to about 60 weight percent of a polyethylene based resins together with a cross-linking agent and a foaming agent to form a resin composition, extruding the resin composition to form a resin sheet: exposing the sheet to an ionizing radiation source to form a cross-linked resin sheet, and heating the cross-linked resin sheet to form a plastic foam material.

According to a further feature of the invention, there is provided a method for preparing a plastic foam material composed of a polyolefin based resin composition, comprising the steps of mixing from about 40 to about 95 weight percent of polypropylene based resins containing from about 2 to about 15 weight percent of ethylene and from about 5 to about 60 weight percent of a polyethylene based resins together with a cross-linking agent and a foaming agent to form a resin composition, extruding the resin composition to form a resin sheet: exposing the sheet to an ionizing radiation source to form a cross-linked resin sheet, heating the cross-linked resin sheet to form a plastic foam material.

According to yet another feature of the invention, there is provided a method for forming a foamed resin, comprising forming a mass of an uncross-linked resin containing a foaming agent, cross-linking the resin in the mass, without activating the foaming agent, and after the step of cross-linking, activating the foaming agent to produce the foamed resin.

According to a still further feature of the invention, there is provided a plastic foam material comprising, in weight percent at least one polypropylene based resin including a melt index of from about 0.05 g/10 minutes to about 12 g/10 minutes, at least one polyethylene based resin including a melt index of from about 2 g/10 minutes to about 50 g/10 min.

The above, and other objects, feature and advantages of the present invention will become apparent from the following description read in conjunction with the accompanying drawing.

DETAILED DESCRIPTION OF THE PREFERRED EMBODIMENT

Figure 1:
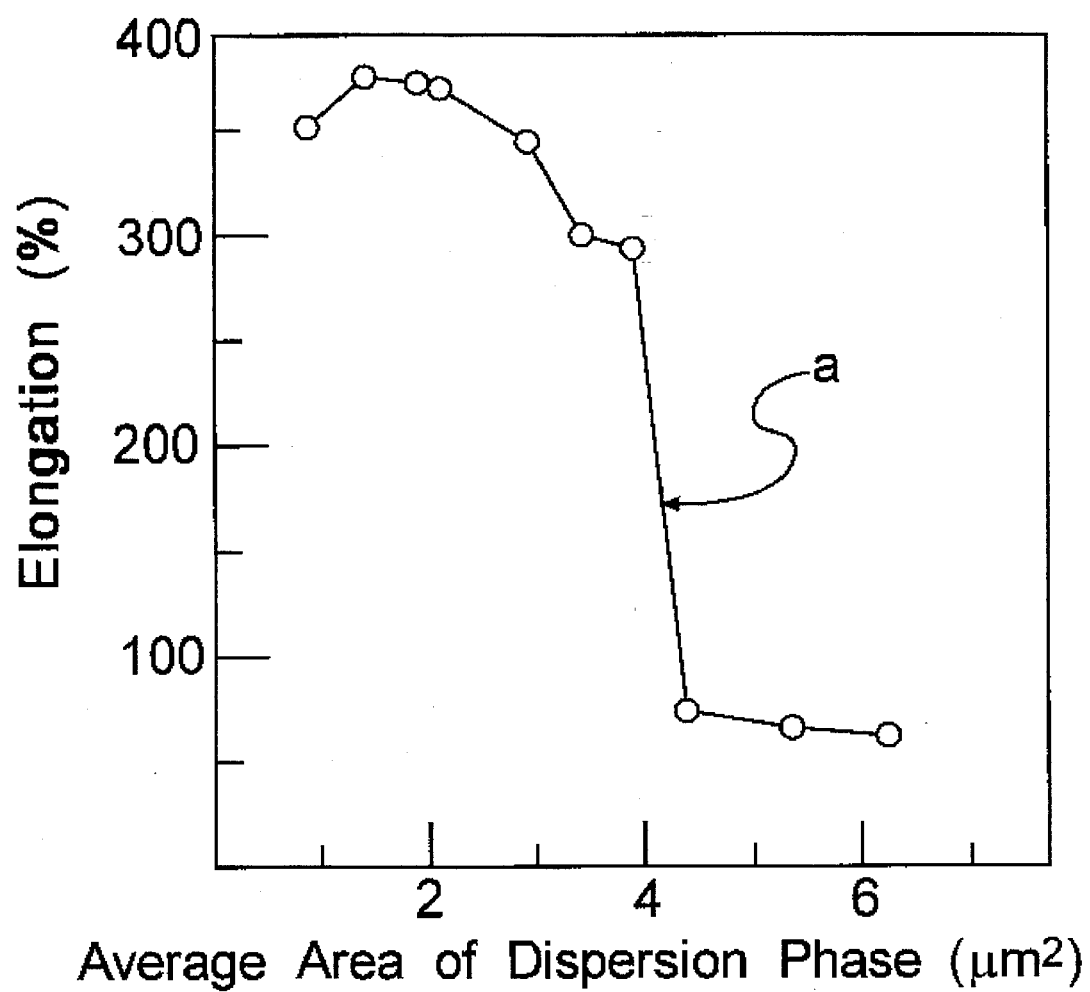
FIG. 1 is a graph showing the correlation between the percentage of elongation of the plastic foam material, and the corresponding average area of its dispersion phase, measured at 160° C.

The plastic foam material of the present invention is composed of a mixture of polypropylene based resins and polyethylene based resins. The plastic foam material includes from about 20 to about 65 weight percent of a cross linked portion which further includes from about 55 to about 95 weight percent of a cross linked polypropylene and from about 5 to about 45 weight percent of a cross linked polyethylene.

The cross linked resin includes a polypropylene based resin matrix (continuous phase) with regions of a polyethylene based resin dispersed (dispersed phase) therein. When viewed in a cross section, the polyethylene based resin region has an average area measuring no more than 4.0 $\mu m^2$ in a phase structure of 400 $\mu m^2$. The average area of the dispersed phase is less than 3.0 $\mu m^2$.

The cross-linking of the two resins can be analytically determined by xylene extraction, whose steps will be described later. After extraction with xylene at 120° C., the resin composition contains, in weight percent, from about 20 to about 65 percent of a residue.

The residue, in turn, contains, in weight percent, from about 55 to about 95 percent of a cross-linked portion of polypropylene and from about 5 to about 45 percent of a cross-linked portion of polyethylene.

The preferred plastic foam material exhibiting superior heat-tolerance and impact resistance properties of the present invention is composed of the components described hereinafter. All percentages hereinafter referred to are in weight terms unless otherwise stated. Polypropylene Based Resin A polypropylene based resin for use in the polyolefin based resin composition includes at least one of a polypropylene, a copolymer of propylene and an $\alpha$-olefin other than propylene, and similar components.

The copolymer of polypropylene includes polypropylene as its major constituent and an $\alpha$-olefin other than propylene as a minor constituent. The minor constituent includes at least one of ethylene, 1-butene, 1-pentene, 1-hexene, 4-methyl-l-pentene, 1-heptene, 1-octene and similar components.

The molding properties (the ability of the plastic foam material to be molded into products encompassing the plastic foam material) of the plastic foam material deteriorates when the content of the $\alpha$-olefin in the copolymer of polypropylene is either too high or too low.

Accordingly, the preferred content of the $\alpha$-olefin in the copolymer of polypropylene should be from about 1 to about 15 percent, and more preferably from about 2 to about 8 percent.

The molding properties of the plastic foam material also degrades when a melt index (hereinafter referred to as "MI") of the polypropylene based resin is low.

On the other hand, heat-tolerance and heat insulating properties of the plastic foam material deteriorate when the MI of the polypropylene based resin is high. In view of the foregoing, the MI of the polypropylene based resin should range from about 0.05 to 12 g per 10 minutes. It is preferable that the MI of the polypropylene based resin be from about 0.3 to 8 g per 10 minutes, and more preferably from about 0.5 to 5 g per 10 minutes.

When the MI of the polypropylene falls below 0.05 g per 10 minutes, the molding properties of the plastic foam material begins to substantially deteriorate. The ability to extrude the polyolefin based resin into molds and to form products also deteriorates when the MI of the polypropylene based resin falls below 0.05 g per 10 minutes.

On the other hand, heat-resistance properties of the plastic foam material is severely compromised when the MI of the polypropylene based resin exceeds 12 g per 10 minutes.

Similarly, the plastic foam material becomes rigid, thereby adversely effecting the molding properties of the plastic foam material, when the content of the polypropylene based resin in the polyolefin based resin composition is too high.

On the other hand, the plastic foam material becomes markedly weak and exhibits inferior heat resistance and heat insulating properties when the content of the polypropylene based resin in the polyolefin based resin composition is low.

Accordingly, the content of the polypropylene based resin in the polyolefin based resin composition should be from about 10 to about 95 percent, and preferably from about 25 to about 95 percent, more preferably from about 40 to about 85, and most preferably from about 45 to about 85 percent.

It is preferred that the polypropylene based resin contains ethylene. It is noted that when the ethylene content in the polypropylene based resin falls below 2 percent, the molding properties of the plastic foam material deteriorates substantially.

Similarly, the heat-resistance and heat insulating properties of the plastic foam material deteriorates when the ethylene content in the polypropylene based resin exceeds 15 percent. It is preferable that the ethylene content be from about 2 to about 15 percent, and more preferable that the ethylene content range from about 2 to about 10 percent.

The ability of the plastic foam material to form foam (i.e. its foaming property) deteriorates when the average molecular weight of the aforementioned polypropylene based resin falls below $2.5\times10^5$.

On the other hand, the softness of the plastic foam material substantially deteriorates when the average molecular weight of the aforementioned polypropylene based resin exceeds $6.0\times10^5$. It is more preferable that the molecular weight of the polypropylene based resin be from about $3.0\times10^5$ to about $5.0\times10^5$.

Polyethylene Based Resin

As mentioned previously, the plastic foam material of this invention is composed of a polyolefin based resin composition, containing specified amounts of polypropylene based resins and polyethylene based resins and specified amounts of cross-linked portions.

The polyethylene based resin can include at least one of a polyethylene, a copolymer of ethylene and an $\alpha$-olefin other than ethylene, exemplified by at least one of propylene, 1-butene, 1-pentene, 1-hexene, 4-methyl-1-pentene, 1-heptene, 1-octene and similar compounds, a copolymer of ethylene and an acrylic acid, a copolymer of ethylene and a methacrylic acid, a copolymer of ethylene and a low molecular weight alkyl ester of an acrylic acid, a copolymer of ethylene and a low molecular weight alkyl ester of a methacrylic acid, a copolymer of ethylene and vinyl acetate, and similar materials.

The molding properties of the plastic foam material is severely compromised when the content of the ethylene in the above-mentioned copolymers i.e., a copolymer of ethylene and acrylic acid, is low. As such, it is preferable that the ethylene content in copolymers of ethylene be at least 80 percent.

A similar deteriorating effect on molding properties i.e., inability to fabricate products from the plastic foam material, is observed when the MI of the polyethylene based resin falls below 2 g per 10 minutes.

On the other hand, the heat-resistance properties including heat insulating properties of the plastic foam material including products derived therefrom deteriorate when the MI of the polyethylene based resin exceeds about 50 g per 10 minutes. It is preferable that the MI range from about 3 to 30 g per 10 minutes.

Likewise, it becomes increasingly difficult to extrude the plastic foam material when the MI of the polypethylene based resin falls below 2 g per 10 minutes. A value of MI below about 2 g per 10 minutes also compromises the overall appearance of the plastic foam material.

When the MI of the polyethylene based resin falls below 2 g per 10 minutes, compatibility between the polyethylene and polypropylene is compromised and dispersion of the resin becomes poor.

On the other hand, the heat-resistance properties of the plastic foam material are greatly compromised when the MI of the polyethylene based resin exceeds 50 g per 10 minutes.

Deterioration of the molding properties of the plastic foam material is also observed when the content of the polyethylene based resin in the polyolefin based resin composition falls below 5 percent. When the content of the polyethylene based resin in the polyolefin based resin composition falls below 5 percent, the plastic foam material tends to become very rigid. This rigidity, in turn, compromises the molding properties of the plastic foam material. It is preferable that the amount of the polyethylene based resin in the polyolefin based resin composition not fall below 15 percent.

On the other hand, when the total amount of the polyethylene based resin in the polyolefin based resin composition exceeds about 90 percent, a deterioration in the heat-resistance and heat insulating properties of the plastic foam material is observed. It is preferable that the total amount of the polyethylene based resin in the 5polyolefin based resin composition not exceed about 75 percent, more preferably 60 percent and most preferably 55 percent.

Apparent Density

When the apparent density of the plastic foam material falls below 0.02 g/cm$^3$, there is a noticeable reduction in the molding properties of the plastic foam material. On the other hand, an apparent density exceeding about 0.2 g/cm$^3$, also results in a degradation in molding properties of the plastic foam material.

Melt Shear Viscosity

The melt shear viscosity of the polypropylene based resin preferably ranges from about 4,000 to about 30,000 poises at 180° to 220° C. with a shear rate of 80 to 800 per second, and more preferably, from 4,500 to about 28,000 poises.

When the melt shear viscosity of the polypropylene based resin exceeds 30,000 poises, it is difficult to extrude the plastic foam material. A melt shear viscosity of more than 30,000 poises makes it difficult to effectively knead a foaming agent together with the polyolefin based resin composition in order to form the plastic foam material.

On the other hand, a low melt shear viscosity of the polypropylene based resin greatly reduces the strength of the kneaded mixture. Accordingly, the melt shear viscosity should not be less than 4000 poises.

The melt shear viscosity of the polyethylene based resin preferably ranges about 2,000 to about 10,000 poises at 180° to 220° C. with a shear rate of 80 to 800 per second. It is more preferable that the melt shear viscosity of the polyethylene based resin be from 2,500 to about 10,000 poises.

When the melt shear viscosity of the polyethylene based resin exceeds 10,000 poises, it is difficult to extrude the plastic foam material. It is also difficult to effectively knead the starting materials to a desired mixture because of the difficulty of evenly kneading a foaming agent into the polyolefin based resin composition.

When the melt shear viscosity of the polyethylene based resin becomes smaller than 2,000 poises, the resulting plastic foam material is noticeably weak. This weakness results from the fact that it becomes exceedingly difficult to evenly knead the starting materials. This unevenness, in turn, imparts reduced strength to the starting material, which, in turn, impairs the final products derived from the resulting plastic foam material.

The melt shear viscosity of the polypropylene based resin will hereinafter, be represented by the symbol ($\mu_1$) while the melt shear viscosity of the polyethylene will, hereinafter, be represented by the symbol ($\mu_2$).

When ($\mu_1$) and ($\mu_2$) are measured under identical conditions, the ratio ($\mu_1$)/($\mu_2$) should preferably be from about 0.3 to about 4.0. If the ratio, as derived from ($\mu_1$)/($\mu_2$), falls outside the aforementioned range, the overall structure and strength of the kneaded mixture containing the polyolefin based resin composition is substantially impaired.. This, in turn, adversely effects the dispersion of the polyethylene based resin in the polypropylene based resin matrix.

Cross-linking Agent, Foaming Agent, and Other Additive

The polyolefin resin composition can further include specified amounts of a cross-linking agent and a thermodecomposition foaming agent (hereinafter referred to as "foaming agent"). Upon heating, the foaming agent decomposes to yield a foam material.

A multi-functional monomer is preferred as a cross-linking agent. The multi-functional monomer should include at least two members selected from the group consisting of a vinyl group, an acryloyl group, a methacryloyl group, and an allyl group.

The multi-functional monomer includes at least one of a divinyl benzene, trimethylol propane triacrylate, 1,6-hexanediol diacrylate, 1,9nonanediol diacrylate, 1,10-decanediol diacrylate, trimethylol propane trimethacrylate, 1,6-hexanediol dimethacrylate, 1,9-nonanediol dimethacrylate, 1,10-decanediol dimethacrylate, 1,2,4-triallyl trimellitate, triethylene glycol diacrylate, tetraethylene glycol diacrylate, cyanoethyl acrylate, bis(4-acryloxy polyethoxy phenyl) propane, triallyl isocyanurate and similar compounds.

The molding properties of the plastic foam material deteriorate when the amount of the cross-linking agent per 100 parts by weight of the polypropylene based resins and the polyethylene based resins falls below 5 percent. If less than 0.5 pan by weight of the cross-linking agent is added, the degree of cross-linking between the constituents to form the plastic foam material is insufficient.

Similarly, if the amount of the cross-linking agent per 100 parts by weight of the polypropylene based resin and the polyethylene based resin exceeds 30 percent, the molding properties of the plastic foam material is severely compromised.

Accordingly, it is preferable that the amount of the cross-liking agent added to 100 parts by weight of the polyolefin based resin composition be from about 0.8 to about 15 parts by weight. If more than 30 parts by weight of cross-linking agent are added, there is a noticeable bleeding of the cross-linking agent toward the surface of the resin composition.

A foaming agent capable of decomposition upon heating is preferable. A preferred foaming agent is one which is organic and which decomposes upon heating, hence its decomposition is thermally initiated, (hereinafter referred to as "foaming agent"). A suitable foaming agent includes at least one of azodicarbonamide (1,1-azobisformamide), benzene sulfonyl hydrazide, dinitrosopentamethylene tetramine, toluene sulfonyl hydrazide, 4,4-oxybis(benzene sulfonyl hydrazide), and similar compounds.

The ability of the polyolefin based resin composition to form foam upon thermal interaction is greatly compromised when the amount of the foaming agent in the polyolefin based resin composition is below 1 percent. On the other hand, the overall strength of the resultant plastic foam material deteriorates when the amount of the foaming agent in the polyolefin based resin composition exceeds 50 percent. It is preferable that the total amount of the foaming agent be from about 4 to about 25 percent.

In addition to the polypropylene based resin, polyethylene based resins, cross-linking reagents and foaming agents, the polyolefin based resin composition may also contain at least one of an antioxidant, a metal deactivator, a flame-retarding agent, a filler, an antistatic agent, a stabilizer, and/or a pigment, etc.

The antioxidant may be a phenol, an amine, or sulfur, etc. The amount of this additive in the polyolefin based resin composition should be in a range effective to prevent damage to the physical properties of the plastic foam material and products derived therefrom.

The polyolefin based resin composition may further contain one of a thermoplastic resin and a radical generating reagent for promoting cross-linking of the constituents. The thermoplastic resin may be polyvinyl chloride based or similar compounds. The radical generating reagent may be benzoyl peroxide or similar compounds.

Miscellaneous

To reiterate, the cross linked resin includes a polypropylene based resin matrix (continuous phase) with regions of a polyethylene based resin dispersed (dispersed phase) therein.

The formability properties of the plastic foam material are considerably superior when the polypropylene based resin forms the continuous phase with the polyethylene based resin being evenly dispersed therein.

To reiterate, a cross sectional view of the plastic foam material yields a polyethylene based resin region having an average area measuring no more than 4.0 $\mu m^2$ in a phase structure of 400 $\mu m^2$. The average area of the dispersed phase is less than 3.0 $\mu m^2$.

When the average area of the dispersed phase exceeds 3 $cm^2$, there is an attendant decrease in the elongation properties of the plastic foam material. This, in turn, compromises the formability properties of the resulting plastic foam material.

A similar effect, i.e., decrease in the elongation and formability properties of the plastic foam material is observed when the area of the dispersed phase exceeds 4.0 $\mu m^2$ in a phase structure of 400 $\mu m^2$.

Preparation of Polyolefin based Resin composition and Plastic foam material derived therefrom In this invention, the polyolefin based resin is prepared from predetermined amounts of polypropylene based resin, polyethylene based resin, cross-linking reagents and foaming agents by means of melt kneading in a conventional kneading machine.

The polyolefin based resin composition is kneaded and molded into shapes of plate, sheet, or tube, etc. It is usually molded into a polyolefin based resin sheet which includes cross linking agents and other constituents at a temperature low enough to prevent decomposition of the foaming agent. Articles may be formed of the material by extrusion and other process.

A kneading machine for use in the melt kneading may include a conventional single screw extruder, a twin screw extruder, a Banbury type mixer, a kneader mixer, a roller, or any other convenient apparatus.

The plastic foam material may be prepared from a melted kneaded polyolefin based resin composition consisting of polypropylene based resin, polyethylene based resin, cross-linking reagent and a foaming agent. The kneaded resin composition is rolled to form a resin sheet. The resulting polyolefin based resin sheet is irradiated by an ionizing radiations source to cross-link the resin sheet.

The, thus obtained cross-linked, polyolefin based resin sheet is then heated in an oven wherein the resin sheet forms a foam material upon thermal decomposition of the foaming agent. Alternatively, the cross-linked, polyolefin based, resin sheet may be rolled by a heating roller and heated to form the plastic foam material. The resulting plastic foam material can thereafter be molded into various articles without fear of decomposing the foaming agent. Both methods may be used under atmospheric pressure.

Alternatively, cross-linked, the polyolefin based resin sheet can be placed in a mold and heated to form the foam material.

The ionizing radiation source may include at least one of a $\alpha$-ray, $\beta$-ray, $\gamma$-ray, electron beam, or similar source. It is preferable that the dosage of the ionizing source (B) range from 0.5 to 20 Mrad. It is more preferable that the dosage of the ionizing radiation be from about 1 to about 6 Mrad. If the dosage of the ionizing radiation source is less than 0.5 Mrad, the degree of cross-linkage is considered low. This in turn, results in a substantially weak plastic foam material, which, in turn, provides weak plastic products which easily break.

On the other hand, if the dosage of the ionizing radiation source exceeds 20 Mrad, the plastic foam material is liable to become rigid, which in turn imparts substantial rigidity to products derived therefrom. Hence, the plastic foam material and products derived therefrom lose their desired softness and resilience.

Therefore, the molded article should be subjected to a limited amount of ionizing radiation to produce a cross-linking reaction. The dosage of ionizing radiation can be determined by formulas 1 and 2:

$$2<A+B<20 \qquad \text{FORMULA 1}$$

$$3<A+B<10 \qquad \text{FORMULA 2}$$

where,

A=Amount, in parts by weight, of multi-functional monomer per 100 parts by weight of polyolefin based resin, and B=Dosage (Mrad) of ionizing radiation.

When the value of A+B falls below 2, the plastic foam material and products derived therefrom exhibit insufficient heat-resistant properties, inferior heat insulating properties and are substantially weak. These inferior properties are thought to be the result of a lower degree of cross-linking.

On the other hand, if the value of A+B exceeds 20, the plastic foam material and products derived therefrom are very rigid and hence easily break upon slight impact. Also, the dispersion of the resin in the plastic resin composition and products derived therefrom is considered to be insufficient. It is preferable that the value of A+B be from about 2 to about 20, and more preferably from about 3 to about 10.

In preparing a plastic foam material of the present invention, it is desirable to match the melt shear viscosities of the polypropylene based resin and the polyethylene based resin during the kneading. If such is not possible, then the melt shear viscosity values should be as close as possible.

In practice, the ratio of the melt shear viscosity should be lower than 3 at the kneading temperature, preferably, lower than 2. If the ratio of the melt shear viscosity value is higher than 3, the dispersion of the resin in the resin composition matrix becomes uneven.

Residue after Xylene Extraction

After preparation of the irradiated plastic foam material, the amount of cross-linkage may be determined by the technique of xylene extraction, As noted previously, the polyolefin based resin composition includes specified amounts of polypropylene based resin and polyethylene based resin. In order to determine cross-linking of the aforementioned resins, an extraction step utilizing xylene at a specified temperature is performed on the aforementioned resin composition.

The extraction process described hereinafter is performed using xylene and yields a residue, which should contain specified amounts of cross linked portions of said two resins.

The strength of the plastic foam material deteriorates substantially when the content of the residue formed during extraction of the polyolefin based resin composition with xylene at 120° C. falls below about 20 percent.

On the other hand, the plastic foam material loses its softness when the amount of residue after extraction from the polyolefin based resin composition exceeds 65 percent. Thus, the preferred amount of the residue afeter extraction form the polyolefin based resin composition is from 20 to about 65 percent.

The following formula is used to determine the total amount of residue left after the xylene extraction process.

$$\text{Residue (weight percent)} = (b/a) \times 100 \quad \text{FORMULA 3}$$

where,

"a" equals initial weight (grams) of plastic foam material composed sample, and

"b" equals weight (grams) of the dried residue collected

The extraction process includes immersing a prescribed amount exemplified by at least 0.1 g of the plastic foam material in 50 ml of xylene at a temperature of 120° C. and leaving it immersed there for 24 hours. This effectively dissolves the uncross-linked material. The resulting contents are then passed through a 200 mesh screen to yield a residue on the screen. The resulting residue is then collected, dried at 80° C. and a vacuum of 10 mm Hg pressure for 5 hours, and weighed. The amount provided by the aforementioned extraction process is then calculated using formula 3, above.

The residue resulting from the above mentioned extraction process contains a cross-linked portion of polypropylene and a cross-linked portion of polyethylene.

The adherence of the plastic foam material to an outer layer (foreign substrate a/k/a skin material) deteriorates substantially when the cross-linked portion of polypropylene in the resulting residue is below about 55 percent. On the other hand, the softness of the plastic foam material deteriorates when the cross-linked portion of polypropylene exceeds 95 percent. Accordingly, the cross-linked portion of polypropylene in the residue is preferably from about 55 to about 95 weight percent.

The adherence of the plastic foam material to an outer layer deteriorates substantially when the cross-linked portion of polyethylene in the resulting residue exceeds 45 percent. On the other hand, the softness of plastic foam material deteriorates when the cross-linked portion of polyethylene falls below 5 percent. Accordingly, the cross-linked portion of polyethylene in the residue is preferably from about 55 to about 95 weight percent.

According to the present invention, the effects of the correlation among the weight of the cross-linked portion of polypropylene ($W_1$), the weight of the cross-linked portion of polyethylene ($W_2$), the weight of the polypropylene based resin ($W_3$), and the weight of the polyethylene based resin ($W_4$), depend upon a ratio represented by the following:

$$(W_1/W_2)/(W_3/W_4).$$

The molding properties of the plastic foam material deteriorates when the ratio exemplified by $(W_1/W_2)/(W_3/W_4)$ falls below 1. Alternatively, the softness of the plastic foam material is compromised when the ratio according to $(W_1/W_2)/(W_3/W_4)$ exceeds 5.

Likewise, the molding properties of the plastic foam material are severely compromised when the residue formed from the plastic foam material after its extraction with xylene is either a very high or a very low percentage part of the total plastic foam material. The extraction process includes extraction with xylene at 120° C. for 24 hours followed by drying at 80° C. and 10 mm Hg pressure for 5 hours. Accordingly the residue should range from about 20 to about 65 percent. The resulting dried residue is the residue left after the last step.

The molding properties of the plastic foam material deteriorate when the swelling ratio defined below of the plastic foam material is either too high or too low. The swelling ratio of the plastic foam material composed of the polyolefin based resin is therefore limited to from about 30 to about 80.

The swelling ratio of the resin is calculated from the weight ($W_1$) of the residue while wet after xylene extraction at 120° C. for 24 hours, and the weight (W6) of the same residue after it was subsequently dried at 80° C. under 10 mm Hg vacuum pressure for 5 hours. The swelling ratio is represented by formula 2, below:

$$\text{Swelling ratio} = \frac{W_5}{W_6} \quad \text{FORMULA 4}$$

where, $W_5$=Weight of wet residue after xylene extraction at 120° C. for 24 hours, and $W_6$=Weight of dried residue after xylene extraction at 120° C. for 24 hours followed by drying at 80° C. and 10 mm Hg pressure for 5 hours.

Examples embodying the plastic foam material and products derived therefrom, exemplified by a layered structure according to the present invention are described below.

EXAMPLE 1

(1) Preparation of a plastic foam material.

An ethylene-propylene copolymer containing 3.6 percent of ethylene (as the polypropylene based resin) having a melt index (MI) of 0.5 g/10 minutes was used together with a polyethylene having an apparent density of 0.920 g/cc and MI of 7 g/10 minutes to provide a polyolefin based resin composition. A cross-linking agent exemplified by divinyl benzene, a foaming agent exemplified by azodicarbonamide, a metal deactivator exemplified by methyl benzotriazole together with two antioxidants exemplified by of a 2,6-di-t-butyl-p-cresol and dilauryl thiopropionate were added to the polyolefin based resin composition.

70 parts of the aforementioned polypropylene based resin, 30 parts of the polyethylene based resin, 1.5 parts of the divinyl benzene, 14 parts of azodicarbonamide, 0.3 parts of 2, 6-di-t-butyl-p-cresol, 0.3 parts of dilauryl thiopropionate, and 0.5 parts of methyl benzotriazole were fed into a twin screw extruder PCM-87 (manufactured by Ikegai Tekko-shyo). The resin composition was melt kneaded at 190° C.

and extruded to form a 1 mm thick, polyolefin based resin sheet.

Thereafter, the obtained polyolefin based resin sheet was cross-linked by exposure to an electron beam measuring 4.0 Mrad. The electron beam was generated by an acceleration voltage of 700 KV. After cross-linking, the cross-linked resin sheet was placed in a vertical, foaming oven with hot air being blown through it.

The cross-linked, polyolefin based, resin sheet was then continuously drawn from the extruder through the oven heated to about 250° C. wherein the foaming agent was thermally decomposes to yield a plastic foam material.

(2) Preparation of Layered Structure

The surface of the plastic foam material was subjected to a pretreatment step. The pretreatment step included surface treating a surface of the plastic foam material by a corona discharge. The, thus obtained, surface treated foam material was then glued to a foreign substrate by means of a polyester based adhesive.

Two liquid polyester based adhesives, HIBON (a polyester obtained from Hitachi Kasei Polymer KK) and DESMODUR R (an isocyanurate obtained from Sumitomo Bayer Urethane Co., Ltd.), were used to adhere an outer surface of the foam material to a foreign substrate.

TABLE 2

| | (Unit = Mrad) | | | | | | | | |
|---|---|---|---|---|---|---|---|---|---|
| | Example | | | | | Comparison example | | | |
| | 1 | 2 | 3 | 4 | 5 | 1 | 2 | 3 | 4 | 5 |
| Amount of Radiation by Electron Beam | 4 | 3.8 | 4.5 | 2 | 1.5 | 2 | 1.5 | 5 | 3 | 1 |

(1) Evaluation of a Plastic foam material

The plastic foam material was extracted with xylene at 120° C. and evaluated by percentage of residues after the extraction, together with percentage of cross-linked portion of polypropylene and percentage of cross-linked portion of polyethylene in the residues. The results are shown in Table 3.

The percentage of cross-linked portion of polypropylene and the percentage of cross-linked portion of polyethylene in the residues were determined by gas chromatography, using a hydrogenation and thermodecomposition technique. The residue obtained from xylene extraction was thermally decomposed at 700° C. Hydrogen gas was then introduced to hydrogenate the thermally decomposed gas. The hydro-

TABLE 1

| | Ethylene-Propylene Copolymer | | | Polyethylene | | | Cross-Linking Aid | |
|---|---|---|---|---|---|---|---|---|
| | Ethylene Content (wt %) | Melt Index (g/10 min) | Amount Charged (Parts) | Density (g/cm$^3$) | Melt Index (g/10 min) | Amount Charged (Parts) | Reagent Code | Amount Added (Part) |
| Examples | | | | | | | | |
| 1 | 3.6 | 0.5 | 70 | 0.920 | 7 | 30 | C | 1.5 |
| 2 | 3.4 | 1.5 | 80 | 0.935 | 7 | 20 | A | 2.0 |
| 3 | 3.0 | 1.5 | 70 | 0.930 | 8 | 30 | D | 1.0 |
| 4 | 5.0 | 1.0 | 55 | 0.925 | 10 | 45 | A | 3.0 |
| | | | | | | | B | 1.5 |
| 5 | 3.6 | 0.5 | 50 | 0.920 | 7 | 50 | A | 3.5 |
| | | | | | | | B | 2.5 |
| Comparison example | | | | | | | | |
| 1 | 3.6 | 0.5 | 70 | 0.920 | 7 | 30 | C | 3.0 |
| 2 | 3.4 | 1.5 | 80 | 0.935 | 7 | 20 | A | 6.0 |
| 3 | 3.0 | 1.5 | 70 | 0.930 | 8 | 30 | D | 6.0 |
| 4 | 5.0 | 1.0 | 55 | 0.925 | 10 | 45 | A | 1.0 |
| | | | | | | | B | 1.0 |
| 5 | 3.6 | 0.5 | 50 | 0.920 | 7 | 50 | A | 0.5 |
| | | | | | | | B | 0.5 |

A = Trimethyl propane trimethacrylate;
B = 1,9-Nonanediol dimethacrylate;
C = Divinyl benzene
D = 1,2,4-Triallyl trimellitate (hereinafter referred to as "skin material"). The skin material was 0.65 mm thick. The outer layer a/k/a skin material contained at least one of a polyvinyl chloride resin and an acrylonitrile-butadiene-styrene copolymerized resin.

EXAMPLES 2–5 AND COMPARISON EXAMPLES 1–5

Numerous plastic foam materials and layered structures encompassing the various plastic foam materials were prepared using the predetermined amounts of ethylene-propylene copolymers, polyethylene, and cross-linking agents in accordance with Table 1. The resin sheets were irradiated with electron beams whose dosages as shown in Table 2.

genated gas was finally analyzed by a G-6800 gas chromatograph (a hydrogenation type gas chromatograph manufactured by Yanagimoto Seisakusho KK).

In addition, the resultant plastic foam materials were subjected to tensile testing in accordance with Japanese Industrial Standard (JIS) K 6767 procedure. The results of the elongation obtained at 80° C., 120° C., 140° C., and 160° C. are shown in Table 4.

(2) Evaluation of Layered Structures molded from the plastic foam material

The various layered structures were then evaluated for their respective appearances. The molding properties of the various layered structures were also evaluated by means of a "H/D value", while adherence between the plastic foam material and the skin material was evaluated by measuring peeling strength. The results are shown in Table 5.

In Table 5, an "o" for the appearance result indicates that no swelling, shrinking, rough surface or the similar was observed. However, if any of these phenomena was observed, an "x" was entered.

The H/D value was obtained by the following measurements: each layered structure was heated by an infra-red heater to raise the temperature of the surface layer of the plastic foam material to 150°–160° C. The layered structure was then vacuum molded into a cylinder with a diameter of 100 cm by means of a mold. The maximum depth (H) and the diameter (D) of each molded cylindrical body was obtained at a point just prior to their rupture. Thereafter, a H/D ratio of each respective cylindrical body was measured and recorded.

The peeling strength was measured by the following procedure. A 25 mm wide, 100 mm long specimen was first cut from the layered structure. The specimen was placed in AUTOGRAPH model DCS-5000 (manufactured by Simadzu) and kept for 5 minutes at 20° C. or 120° C. The peeling strength (Kg/25 mm) was measured at a time when the outer layer was peeled off.

TABLE 3

| | (Unit = Weight %) | | |
|---|---|---|---|
| | Residue After Xylene Extraction at 120° | | |
| | Percentage Residue | Cross-Linked Portion of Polypropylene | Cross-Linked Portion of Polyethylene |
| Example | | | |
| 1 | 39 | 78 | 22 |
| 2 | 42 | 84 | 16 |
| 3 | 40 | 80 | 20 |
| 4 | 43 | 68 | 32 |
| 5 | 39 | 74 | 26 |
| Comparison example | | | |
| 1 | 37 | 97 | 3 |
| 2 | 39 | 96 | 4 |
| 3 | 63 | 68 | 32 |
| 4 | 41 | 52 | 48 |
| 5 | 19 | 44 | 56 |

TABLE 4

| | Elongation of Plastic Foam Material | | | |
|---|---|---|---|---|
| | 80° C. | 120° C. | 140° C. | 160° C. |
| Example | | | | |
| 1 | 520 | 690 | 440 | 240 |
| 2 | 650 | 720 | 500 | 280 |
| 3 | 600 | 700 | 480 | 260 |
| 4 | 490 | 630 | 390 | 210 |
| 5 | 530 | 680 | 420 | 230 |
| Comparison examples | | | | |
| 1 | 480 | 590 | 400 | 200 |
| 2 | 460 | 580 | 420 | 210 |
| 3 | 430 | 440 | 320 | 140 |
| 4 | 500 | 510 | 350 | 180 |
| 5 | 490 | 510 | 270 | 120 |

TABLE 5

| | | Formability | Peeling Strength (Kg/25 mm) | |
|---|---|---|---|---|
| | Appearance | H/D Value | 20° C. | 120° C. |
| Example | | | | |
| 1 | O | 1.1 | 5.6 | 0.59 |
| 2 | O | 1.2 | 5.9 | 0.66 |
| 3 | O | 1.2 | 5.8 | 0.62 |
| 4 | O | 1.0 | 5.3 | 0.52 |
| 5 | O | 1.1 | 5.4 | 0.57 |
| Comparison examples | | | | |
| 1 | X | 0.5 | 1.6 | 0.27 |
| 2 | X | 0.6 | 1.9 | 0.31 |
| 3 | X | 0.3 | 2.1 | 0.22 |
| 4 | X | 0.5 | 4.8 | 0.35 |
| 5 | X | 0.3 | 1.2 | 0.18 |

EXAMPLES 6–9 AND COMPARISONS EXAMPLES 6–11

Using the predetermined amounts of ethylene-propylene copolymer, polyethylene, and cross-linking agent shown in Table 6, together with 13 parts of azodicarbonamide and the radiation dosage of the electron beam shown in Table 7, numerous plastic foam materials and derived layered structures were obtained in accordance with the procedure previously described in example 1 with the exception that a single screw extruder was used instead of a twin screw extruder.

(1) Evaluation of a Plastic foam material

The plastic foam material including structured layers containing the plastic foam material were extracted with xylene at 120° C. and evaluated. The evaluation including determining the weight percent of residue after the extraction, together with the ratio $W_1/W_2$ of the weight of the cross-linked portion of polypropylene ($W_1$) and the weight of the cross-linked portion of polyethylene ($W_2$) in the residue, and the ratio $W_3/W_4$ of the weight of the polypropylene based resin ($W_3$) and the weight of the polyethylene based resin ($W_4$) before cross-linking, and the overall ratio $(W_1/W_2)/(W_3/W_4)$. First, the ratio $W_1/W_2$ and the ratio $W_3/W_4$ were calculated. The ratio $(W_1/W_2)/(W_3/W_4)$ was then calculated and the results are shown in Table 8.

(2) Evaluation of Layered Structures molded from the plastic foam material

The thus obtained layered structures were then evaluated for their respective appearances. The molding properties of the various layered structures were also evaluated by means of a "H/D value", while adherence between the plastic foam material and the skin material was evaluated by measuring peeling strength. The appearance of the layered structure was observed and evaluated. The molding properties of the resin composition and adherence between the plastic foam material and the outer layer were measured in accordance with the procedure outlined in examples 1–5. The results are shown in Table 9.

It seems clear from the test results that the plastic foam material of the present invention including its derived products exhibit superior molding properties together with superior adhesive properties. The molded structure and products derived from the plastic foam material of the present invention therefrom encompassing the plastic foam material of the present exhibit superior appearance and do not appear swollen, wrinkled or plagued by any other surface deformities.

TABLE 6

| | Ethylene Propylene Copolymer | | | Polyethylene | | | Cross-Linking Aid | |
|---|---|---|---|---|---|---|---|---|
| | Ethylene Content (wt %) | Melt Index (g/10 min) | Amount Charged (Parts) | Density (g/cm$^3$) | Melt Index (g/10 min) | Amount Charged (Parts) | Reagent Code | Amount Added (Part) |
| Example | | | | | | | | |
| 6 | 3.0 | 1.5 | 80 | 0.935 | 7 | 20 | C | 3.0 |
| 7 | 3.6 | 0.5 | 60 | 0.935 | 7 | 40 | A | 2.5 |
| 8 | 5.0 | 1.0 | 70 | 0.925 | 10 | 30 | D | 4.0 |
| 9 | 3.4 | 1.0 | 70 | 0.930 | 8 | 30 | A | 1.5 |
| | | | | | | | B | 1.5 |
| Comparison examples | | | | | | | | |
| 6 | 3.0 | 1.5 | 80 | 0.935 | 7 | 20 | C | 1.0 |
| 7 | 3.6 | 0.5 | 60 | 0.935 | 7 | 40 | A | 1.0 |
| 8 | 3.6 | 0.5 | 60 | 0.935 | 7 | 40 | A | 6.0 |
| 9 | 5.0 | 1.0 | 70 | 0.925 | 10 | 30 | D | 1.5 |
| 10 | 3.0 | 1.5 | 80 | 0.935 | 7 | 20 | C | 3.0 |
| 11 | 3.0 | 1.5 | 80 | 0.935 | 7 | 20 | C | 1.0 |

A = Trimethyl propane trimethacrylate
B = 1,9-Nonanediol dimethacrylate
C = Divinyl benzene
D = 1,2,4-Triallyl trimellitate

TABLE 7

| | (Unit = Mrad) | | | | | | | | |
|---|---|---|---|---|---|---|---|---|---|
| | Example | | | | Comparison | | | | |
| | 6 | 7 | 8 | 9 | 6 | 7 | 8 | 9 | 10 | 11 |
| Amount of Radiation by Electron Beam | 3 | 2.5 | 1.8 | 2.5 | 5.5 | 6 | 1.5 | 7 | 7 | 1 |

TABLE 8

| | Reside After Xylene Extraction at 120° C. | | | |
|---|---|---|---|---|
| | Percentage Residue (Weight %) | $W_1/W_2$ | $W_3/W_4$ | $(W_3/W_4)$ |
| Example | | | | |
| 6 | 44 | 4.56 | 4.00 | 1.14 |
| 7 | 38 | 4.55 | 1.50 | 3.04 |
| 8 | 39 | 4.88 | 2.33 | 2.10 |
| 9 | 32 | 3.55 | 2.33 | 1.52 |
| Comparison examples | | | | |
| 6 | 42 | 1.38 | 4.00 | 0.35 |
| 7 | 40 | 0.72 | 1.50 | 0.48 |
| 8 | 41 | 15.7 | 1.50 | 10.5 |
| 9 | 43 | 1.27 | 2.33 | 0.55 |
| 10 | 69 | 3.17 | 4.00 | 0.79 |
| 11 | 18 | 4.56 | 4.00 | 1.14 |

$W_1$ = Weight of cross-linked portion of polypropylene in residue
$W_2$ = Weight of cross-linked portion of polyethylene in residue
$W_3$ = Weight of polypropylene based resin before cross-linking
$W_4$ = Weight of polyethylene based resin before cross-linking

TABLE 9

| | | | Peeling Strength (Kg/25 min) | |
|---|---|---|---|---|
| | | Formability | | |
| | Appearance | H/D Value | 20° C. | 120° C. |
| Example | | | | |
| 6 | O | 1.1 | 5.3 | 0.54 |
| 7 | O | 1.0 | 5.1 | 0.49 |
| 8 | O | 1.2 | 5.9 | 0.62 |
| 9 | O | 1.4 | 5.4 | 0.60 |
| Comparison examples | | | | |
| 6 | X | 0.3 | 1.4 | 0.18 |
| 7 | X | 0.2 | 1.3 | 0.18 |
| 8 | X | 1.1 | 4.2 | 0.40 |
| 9 | X | 0.4 | 1.0 | 0.21 |
| 10 | X | 0.3 | 5.2 | 0.16 |
| 11 | X | 0.2 | 1.3 | 0.09 |

EXAMPLE 10

(1) Preparation of a plastic foam material

A resin composition, containing, 60 parts by weight of a polypropylene based resin, 40 parts by weight of a polyethylene based resin, 3.5 parts by weight of divinyl benzene, 13 parts by weight of azodicarbonamide, 0.3 parts by weight of 2, 6-di-t-butyl-p-cresol, 0.3 parts by weight of dilauryl thiopropionate, and 0.5 parts by weight of methyl benzotriazole was introduced into a twin screw extruder PCM-30 (manufactured by Ikegai Tekkoshyo).

The polypropylene based resins included an ethylene-propylene copolymer contained 3.6 weight percent of ethylene. The polypropylene based resin further included a molecular weight of 4.7×10$^5$ and a melt index (MI) of 0.5 g/10 minutes.

The polyethylene based resins had a density of 0.920 g/cc and a MI of 7 g/10 minutes. Divinyl benzene was employed as a cross-linking agent to aid in cross-linking the various compounds, while azodicarbonamide was used as a foaming agent, and the methyl benzotriazole was employed as a metal deactivator. 2,6-di-t-butyl-p-cresol and dilauryl thiopropionate were used as antioxidants.

The resin composition was melt kneaded at 190° C. to yield a polyolefin based, plastic foam material which was then extruded to form a 1 mm thick plastic foam material sheet.

The plastic foam material sheet was irradiated with a 2.5 Mrad electron beam to provide a cross-linked, polyolefin based, plastic foam material sheet. The electron beam was generated by an acceleration voltage of 700 KV.

The, thus formed cross-linked, polyolefin based, plastic foam material sheet was finally placed in a vertical, foaming oven through which hot air was blown constantly.

The step of placing the cross-linked, polyolefin based plastic foam material sheet in the oven at 250° C. aided in the formation of the plastic foam material of the present invention.

(2) Preparation of Layered structure derived from the plastic foam material

To prepare a layered structure encompassing the plastic foam material of the present invention, initially a surface of the thus formed plastic foam material was pre-treated by corona discharge.

Thereafter, a polyester based adhesive containing at least two liquids, exemplified by HIBON (a polyester obtained from Hitachi Kasei Polymer KK) and DESMODUR R (an isocyanurate obtained from Sumitomo Bayer Urethane Co., Ltd.), was applied to the pre-treated surface of the plastic foam material. Then, an outer layer composed of at least one of a polyvinyl chloride resin and an acrylonitrile-butadiene-styrene copolymerized resin was applied to a thickness of about 0.65 mm onto the adhesive coated, pre-treated surface of the plastic foam material.

EXAMPLE 11–15

For examples 11–14, numerous plastic foam materials including layered structures derived therefrom were prepared. The plastic foam material and layered structures were formed utilizing the predetermined amounts of ethylenepropylene copolymer, polyethylene, and cross-linking agent in accordance with Table 10. Plastic foam materials and the various layered structures were irradiated with electron beams in accordance with the dosages shown in Table 12.

TABLE 10

|  | Example | | | | | |
|---|---|---|---|---|---|---|
|  | 10 | 11 | 12 | 13 | 14 | 15 |
| Ethylene-Propylene Copolymer | | | | | | |
| Ethylene Content (Wt %) | 3.5 | 6 | 8 | 9 | 9 | 9 |
| Weight Average Molecular Weight (× $10^5$) | 4.7 | 3.4 | 4.6 | 4.3 | 4.3 | 4.3 |
| MI (g/10 minutes) | 0.5 | 1.8 | 0.8 | 1.0 | 1.0 | 1.0 |
| Amount Charged (Part) | 60 | 60 | 70 | 80 | 80 | 80 |

TABLE 10-continued

|  | Example | | | | | |
|---|---|---|---|---|---|---|
|  | 10 | 11 | 12 | 13 | 14 | 15 |
| Polyethylene | | | | | | |
| Weight Average Molecular Weight (× $10^4$) | 5.5 | 3.8 | 4.6 | 4.4 | 4.4 | 4.4 |
| MI (g/10 minutes) | 7 | 7 | 8 | 14 | 14 | 14 |
| Density (g/cm$^3$) | 0.920 | 0.918 | 0.918 | 0.925 | 0.925 | 0.925 |
| Amount Charged (Part) | 40 | 40 | 30 | 20 | 20 | 20 |
| Cross-linking agent | | | | | | |
| Reagent Code | A | A | A | C | D | B |
| Amount Added (Part) | 3.5 | 4.0 | 4.0 | 2.0 | 4.0 | 2.5 |

A = Divinyl benzene;
B = Trimethylol propane trimethacrylate;
C = Tri allyl trimellitate;
D = Mixture of B and 1,9-nonanediol dimethacrylate (1:1).

TABLE 11

|  | Comparison examples | | | |
|---|---|---|---|---|
|  | 12 | 13 | 14 | 15 |
| Ethylene Propylene Copolymer | | | | |
| Ethylene Content (Wt %) | 3.5 | 4.0 | 6.0 | 2.0 |
| Weight Average Molecular Weight (× $10^5$) | 4.7 | 2.0 | 4.0 | 2.8 |
| MI (g/10 minutes) | 0.5 | 3.0 | 1.8 | 0.6 |
| Amount Charged (Part) | 60 | 65 | 35 | 65 |
| Weight Average Molecular Weight (× $10^4$) Polyethylene | 5.5 | 4.2 | 4.4 | 2.8 |
| MI (g/10 minutes) | 7 | 10 | 10 | 10 |
| Density (g/cm$^3$) | 0.920 | 0.926 | 0.918 | 0.914 |
| Amount Charged (Part) | 40 | 35 | 65 | 35 |
| Divinyl benzene (Part) | 3.5 | 2.5 | 2.5 | 3.0 |

TABLE 12

| (Unit = Mrad) | | | | | | | | | | |
|---|---|---|---|---|---|---|---|---|---|---|
|  | Example | | | | | | Comparison example | | | |
|  | 10 | 11 | 2 | 13 | 14 | 15 | 12 | 13 | 14 | 15 |
| Amount of Electron Beam Radiation | 2.5 | 1.5 | 2.5 | 2 | 2 | 1.5 | 6 | 5 | 2.5 | 3.5 |

TABLE 13

| | Example | | | | | |
|---|---|---|---|---|---|---|
| | 10 | 11 | 12 | 13 | 14 | 15 |
| Plastic Foam material | | | | | | |
| Apparent Density (g/cm$^3$) | 0.050 | 0.050 | 0.048 | 0.056 | 0.045 | 0.041 |
| Percentage Residue (Wt %) | 38 | 37 | 43 | 34 | 52 | 32 |
| Swelling Ratio | 54 | 60 | 46 | 74 | 44 | 67 |

*Residue after extraction with xylene at 120° C. for 24 hours, followed by drying at 80° C. under 10 mm Hg pressure for 5 hours.

TABLE 14

| | Comparison examples | | | |
|---|---|---|---|---|
| | 12 | 13 | 14 | 15 |
| Plastic foam material | | | | |
| Apparent Density (g/cm$^3$) | 0.060 | 0.045 | 0.045 | 0.045 |
| Percentage Residue (Wt %) | 62 | 52 | 36 | 43 |
| Swelling Ratio | 31 | 33 | 52 | 28 |

*Residue after extraction with xylene at 120° C. for 24 hours, followed by drying at 80° C. under 10 mm Hg pressure for 5 hours.

TABLE 15

| | Example | | | | | |
|---|---|---|---|---|---|---|
| | 10 | 11 | 12 | 13 | 14 | 15 |
| Layered structure | | | | | | |
| Appearance | o | o | o | o | o | o |
| Formability H/D Value | 1.1 | 1.0 | 0.9 | 1.0 | 1.0 | 0.9 |

TABLE 16

| | Comparison examples | | | |
|---|---|---|---|---|
| | 12 | 13 | 14 | 15 |
| Layered structure | | | | |
| Appearance | X | X | X | X |
| Formability H/D Value | 0.5 | 0.4 | 0.4 | 0.5 |

EXAMPLE 15

Using predetermined amounts of ethylene-propylene copolymer, polyethylene, and cross-linking agent as shown in Table 10, together with the predetermined radiation dosages of the electron beam as shown in Table 12, a cross-linked, polyolefin based, plastic foam material and a sheet containing the plastic foam material was obtained. The method used to prepare the plastic foam material and sheet was similar to the process outlined in example 10.

The cross-linked, polyolefin based, plastic foam material based resin sheet was then placed in a vertical, foaming oven with hot air blowing through it.

The cross-linked, polyolefin based, plastic foam material based resin sheet was continuously drawn from the extruder through the foaming oven at 230° C. to provide a continuous sheet of plastic foam material of the present invention.

Thereafter, a layered structure containing the thus formed plastic foam material body was obtained by a process similar to example 10.

COMPARISON EXAMPLES 12–15

Predetermined amounts of ethylene-propylene copolymer, polyethylene, and divinyl benzene as shown in Table 11 were used to form various plastic foam materials and their derived layered structures. The plastic foam material and layered structures were irradiated with an electron beam in accordance with the dosages shown in Table 12.

(1) Evaluation of the resulting plastic foam material and layered structures

Apparent densities of the various plastic foam materials and layered structures, exemplified by examples 10–15 and comparison examples 12–15 were measured.

After extraction with xylene at 120° C. for 24 hours, followed by drying at 80° C. in a vacuum of 10 mm Hg pressure for 5 hours, the resulting residue was evaluated and the swelling ratio was calculated.

The results are illustrated in Tables 13 and 14.

(2) Evaluation of the layered structures derived from the various plastic foam materials The layered structures obtained in accordance with examples 10–15 and comparison examples 12–15 were observed and evaluated for their overall appearance. Strength and molding properties were also evaluated by determining their respective H/D ratios. The results are shown in Tables 15–16.

In Tables 15 and 16, an "o" in the appearance column indicates a smooth surface i.e., the absence of swelling and shrinkage. Alternatively, "x" indicates the opposite.

The H/D value was obtained in the following manner. The layered structure was heated by an infra-red heater such that the temperature of the surface layer of the plastic foam material reached about 150° C. to about 160° C. Thereafter, the layered structure was vacuum molded into a cylinder measuring about 100 cm in diameter. The maximum depth a sample achieved without its rupture was determined.

The maximum depth (H) and the diameter (D) of the molded cylindrical structure was measured. Thereafter, the ratio of H/D was calculated based upon the thus obtained (H) and (D) values.

EXAMPLES 16

The plastic foam material for this example contained a polypropylene based resin having a melt index (MI) of 0.5 g/10 minutes and a polyethylene based resin having a melt index (MI) of 10.0 g/10 minutes. The ratio of the melt shear viscosity of polypropylene ($\mu_1$) and polyethylene ($\mu_2$) was recorded at no more than 3.7. This value was obtained by measuring $\mu_1$ and $\mu_2$ together at a temperature ranging from about 180 to about 220° C. with a shear rate of 80 to 800 per second ($s^{-1}$).

The polyolefin based resin composition further included a cross-linking agent such as divinyl benzene, a foaming agent such as azodicarbonamide, a metal deactivator exemplified by methyl benzotriazole and two antioxidants such as 2,6-di-t-butyl-p-cresol and dilauryl thiopropionate.

In accordance with the values shown in Table 17, a polyolefin based resin composition was prepared containing from about 60 parts by weight of the aforementioned polypropylene based resin, together with 40 parts by weight of the polyethylene based resin, 13 parts by weight of azodicarbonamide, 2.5 parts by weight of divinyl benzene, 0.3 part by weight of 2, 6-di-t-butyl-p-cresol, 0.3 part by weight of dilauryl thiopropionate, and 0.5 part by weight of methyl benzotriazole. The thus formed polyolefin based resin composition was then mixed and extruded by means of a twin screw extruder at 190° C. to form a 1 mm thick polyolefin based resin sheet.

The thus formed polyolefin based resin sheet was irradiated with a 3.0 Mrad electron beam to form a cross-linked, polyolefin based resin sheet.

The resulting cross-linked, polyolefin based resin sheet was placed in an oven at 250° C. for 5 minutes without load to form foam. Thereafter, a 3.2 mm thick, plastic foam material with an apparent density of 0,050 g/cm$^3$ was obtained.

The gel fraction of the thus formed plastic foam material was determined to be 38 percent. Refer to Table 17. The gel fraction is used to indicate the degree of cross-linkage and is expressed by the percentage of the residue obtained after extraction with xylene at 120° C.

To measure the residue resulting from the xylene extraction, about 0.1 g of the plastic foam material was immersed in 50 ml of xylene and kept there at 120° C. for 24 hours. This effectively dissolved the uncross-linked portion of the foam material. The contents of the container were then poured through a 200 mesh screen to effectively separate the residue from solution. The resulting residue retained by the screen was collected, dried at 80° C. and 10 mm Hg pressure for 5 hours, and weighed.

The amount (weight percentage) of the resulting residue was calculated by utilizing the aforementioned formula 3, wherein $$\text{Residue (weight percent)} = (b/a) \times 100 \quad \text{FORMULA 3}$$

where, a equals initial weight of the sample plastic foam material (gram)

b equals weight of the dried residue collected (gram)

A surface of the plastic foam material sheet of the polyolefin based resin was then pre-treated by corona discharge. Using a polyester based adhesive, the pre-treated surface was coated with a commercially available impact-resistant mixed resin sheet to form a layered structure. (The impact-resistant mixed resin sheet is also referred to as a skin material).

The commercially available impact-resistant mixed resin sheet was 0.65 mm thick and contained at least one of a polyvinyl chloride resin and ABS (acrylonitrile-butadiene-styrene copolymerized) resin.

The layered structure was then vacuum molded. The vacuum moldability and appearance are shown Table 17.

During vacuum molding, the layered structure containing the plastic foam material of the present invention was heated by an infra red heater until the temperature of its surface ranges from about 150° C. to about 160° C.

To determine the maximum depth (H), the layered structure was vacuum molded in a mold having a cylindrical indentation measuring 100 mm in diameter and 150 mm deep. The maximum depth (H) achieved without rupture of the molded cylindrical body was obtained along with its diameter (D). The ratio H/D was calculated and used to evaluate the vacuum moldability.

A high H/D value indicates that the layered structure exhibits superior vacuum moldability.

Appearance of the vacuum molded cylindrical body was noted and the results are reported in Table 17. An "o" indicates that the cylindrical body was smooth surfaced and did not exhibit any breakage, swelling or indentation in its appearance. On the other hand, "x" indicates the opposite, i.e. deformed cylindrical bodies.

EXAMPLES 17–20 AND COMPARISON EXAMPLES 16–19

With the predetermined component amounts, a cross-linked, polyolefin based resin sheet and a layered structure derived therefrom was obtained containing specified amounts of a polypropylene based resin, a polyethylene based resin, cross-linking agent, and radiation of electron beam in accordance with

TABLE 17

|  | Example 16 | Example 17 | Example 18 | Example 19 | Example 20 |
|---|---|---|---|---|---|
| PP | | | | | |
| Melting Index g/10 min | 0.5 | 1.8 | 0.5 | 0.5 | 1.0 |
| Melt Shearing Viscosity, $\mu_1$ (A) (poise) | 6000–28000 | 4500–22000 | 6000–26000 | 7000–28000 | 8000–20000 |
| PE | | | | | |
| Melting Index g/10 min | 10 | 8 | 18 | 8 | 10 |
| Melt Shearing Viscosity, $\mu_2$ (B) (poise) | 3000–7500 | 2500–8500 | 4000–7000 | 5000–10000 | 5000–10000 |
| PP/PE Weight Ratio | 60/40 | 50/50 | 60/40 | 60/40 | 80/20 |
| Temperature (C.°) | 180 | 220 | 190 | 200 | 190 |
| Shear Rate (s$^{-1}$) | 80 | 360 | 360 | 120 | 120 |
| $\mu_1$ of PP | 28000 | 11000 | 10000 | 27000 | 14000 |
| $\mu_2$ of PE | 7500 | 4000 | 4500 | 8500 | 7000 |
| $\mu_1/\mu_2$ | 3.7 | 2.8 | 3.6 | 3.2 | 2.0 |
| Cross Linking Agent | DVB | DVB | TRIAM | TMPT | TMPT |
| Amount of Electron Beam Radiation (Mrad) | 3.0 | 3.5 | 6.0 | 4.0 | 4.5 |
| Gel Fraction (%) | 38 | 42 | 55 | 40 | 44 |
| Appearance | O | O | O | O | O |
| H/D | 1.1 | 1.2 | 1.0 | 1.1 | 1.2 |

TABLE 18

|  | Comparison example 16 | Comparison example 17 | Comparison example 18 | Comparison example 19 |
|---|---|---|---|---|
| PP | | | | |
| Melting Index g/10 min | 0.3 | 1.0 | 0.5 | 0.3 |
| Melt Shearing Viscosity, $\mu_1$ (A) (poise) | 8000–44000 | 6000–20000 | 6000–26000 | 10000–40000 |
| PE | | | | |
| Melting Index g/10 min | 20 | 20 | 25 | 5 |
| Melt Shearing Viscosity, $\mu_2$ (B) (poise) | 2500–5000 | 500–5000 | 1000–4000 | 7000–13000 |
| PP/PE Weight Ratio | 50/50 | 65/35 | 75/25 | 80/20 |

TABLE 18-continued

|  | Comparison example 16 | Comparison example 17 | Comparison example 18 | Comparison example 19 |
|---|---|---|---|---|
| Temperature (C.°) | 190 | 220 | 180 | 200 |
| Shear Rate (s⁻¹) | 120 | 800 | 80 | 120 |
| $\mu_1$ of PP | 25000 | 6000 | 10000 | 27000 |
| $\mu_2$ of PE | 4500 | 500 | 4500 | 8500 |
| $\mu_1/\mu_2$ | 5.6 | 12.0 | 6.5 | 4.5 |
| Cross Lining Agent | TRIAM | TMPT | DVB | DVB |
| Amount of Electron | 4.0 | 5.0 | 5.0 | 6.0 |
| Beam Radiation (Mrad) | 4.0 | 5.0 | 5.0 | 6.0 |
| Gel Fraction (%) | 38 | 35 | 47 | 58 |
| Appearance | x | x | x | x |
| H/D | 0.5 | 0.4 | 0.4 | 0.3 |

Tables 17–18. The plastic foam material based sheet and resulting foam material were obtained by a process similar to the one disclosed in example 16.

Gel fraction and resin dispersion values of the plastic foam material were measured using the procedure described in example 16. In determining resin dispersion, the average dispersion phase area was measured when the dispersion phase consisted of polyethylene.

The appearance and the vacuum moldability of the layered structure were also evaluated following the procedure outlined previously in example 16. All the results obtained are shown in tables 17–18.

In tables 17–18, polypropylene is designated "PP", while polyethylene is designated "PE". The temperature and the shear rate reflect the values of maximum $(\mu_1)/(\mu_2)$. Divinyl benzene is represented by "DVB", while triallyl trimellitate is identified by the letters "TRIAM", and trimethylolpropane trimethacrylate is represented by "TMPT".

It seems clear that the layered structures made from the plastic foam material made in accordance with the processes outlined in examples 16–20 (according to the present invention) exhibit superior appearance and vacuum moldability with a $(\mu_1)/(\mu_2)$ smaller than about 4.0, while the plastic foam material obtained in accordance with comparison examples 16–19 exhibit poor appearance and vacuum moldability with a $(\mu_1)/(\mu_2)$ larger than about 4.5.

EXAMPLE 21

A polyolefin based resin composition for forming a plastic foam material and layered structures derived therefrom according to this example included 60 parts by weight of a polypropylene based resin with a melt index (MI) of 0.5 g/10 minutes, 40 parts of polyethylene based resin having a melt index (MI) of 4.0 g/10 minutes together with 13 parts by weight of a foaming agent such as azodicarbonamide, 3.5 parts by weight of a cross-linking agent such as divinyl benzene, 0.3 parts by weight of antioxidants such as 2, 6-di-t-butyl-p-cresol and dilauryl thiopropionate, and 0.5 part weight of a metal deactivator such as methyl benzotriazole. Refer to Table 19.

The resulting polyolefin based resin composition was placed in a twin screw extruder and extruded at 190° C. to form a 1 mm thick, polyolefin based resin sheet.

The polyolefin based resin sheet was subsequently radiated by a 3.0 Mrad electron beam to form a cross-linked, polyolefin based resin sheet.

The thus obtained cross-linked, polyolefin based resin sheet was placed in an oven at 250° C. for 5 minutes without load to effectively yield a plastic foam material.

The plastic foam material was molded to form a 3.2 mm thick plastic foam material structure having an apparent density of 0.050 g/cm³.

The gel fraction of the plastic foam material is shown in Table 19. The procedure to measure the gel fraction value was similar to the procedure utilized in example 16.

The amount of the residue remaining after extraction with xylene was calculated in accordance with formula 3.

Additionally, the plastic foam material was dyed with RuO₄ and cross-section slices were analyzed by means of a TEM (transmission electron microscope). The micrograph was analyzed for determining the rate of dispersion of the plastic foam material together with the average area of the dispersion phase. The results are shown in Table 19.

The amount (in percentage) the plastic foam material elongates, was measured using a TENSILON UCT 500 model, manufactured by Orientec

TABLE 19

|  |  |  | Examples |  |  |  | Comparison examples |  |  |  |  |
|---|---|---|---|---|---|---|---|---|---|---|---|
|  |  |  | 21 | 22 | 23 | 24 | 20 | 21 | 22 | 23 | 24 |
| Melt Index | Polypropylene |  |  |  |  |  |  |  |  |  |  |
|  |  | Amount (Part by Weight) | 60 | 70 | 75 | 65 | 55 | 30 | 60 | 50 | 60 |
|  |  | Melt Index | 0.5 | 0.5 | 1.8 | 1.8 | 0.5 | 6.0 | 0.5 | 0.5 | 1.8 |
|  | Polyethylene |  |  |  |  |  |  |  |  |  |  |
|  |  | Amount (Part by Weight) | 40 | 30 | 25 | 35 | 45 | 70 | 40 | 50 | 40 |
|  |  | Melt Index | 8.0 | 18 | 8.0 | 18 | 8.0 | 8.0 | 18 | 18 | 18 |
| Foaming Agent |  |  | 13 | 13 | 13 | 13 | 13 | 13 | 13 | 13 | 13 |
| Multiple | Divinyl Benzene |  | 3.5 | — | — | — | 4.5 | — | — | — | 4.0 |
| Functional | Triallyl Trimellitate |  | — | 4.0 | 2.5 | — | — | 4.0 | 4.5 | — | — |
| Monomer | Trimethylol Propane Triacrylate |  | — | — | — | 2.5 | — | — | — | 5.5 | — |
| Amount of Radiation |  |  | 3.0 | 1.5 | 4.0 | 3.0 | 10 | 3.0 | 5.0 | 4.0 | 6.0 |
| (A + B)/ |  |  | 6.5/ | 5.5/ | 6.5/ | 5.5/ | 11.5/ | 7.0/ | 9.5/ | 9.5/ | 10.0/ |
| (A × B) |  |  | 10.5 | 6.0 | 10.0 | 7.5 | 15.0 | 12.0 | 22.5 | 22.0 | 24.0 |
| Degree of Cross-Linkage |  |  | 38 | 36 | 50 | 42 | 48 | 53 | 49 | 52 | 46 |
| Dispersion | Amount of Radiation |  | PP | PP | PP | PP | PE | PE | PP · PE | PP | PP |
| Condition | Dispersed Phase |  | PE | PE | PE | PE | PP | PP | — | PE | PE |

TABLE 19-continued

|  | Examples | | | | Comparison examples | | | | |
| --- | --- | --- | --- | --- | --- | --- | --- | --- | --- |
|  | 21 | 22 | 23 | 24 | 20 | 21 | 22 | 23 | 24 |
| Averag Area of Dispersed Phase (μm²) | 2.0 | 1.8 | 2.5 | 1.6 | 1.6 | — | — | 5.5 | 3.6 |
| Presence of Any Dispersed Phase Larger Than 4.0 μm² | No | No | No | No | — | — | — | Yes | Yes |
| Vacuum Moldability (H/D) | 1.0 | 1.2 | 1.1 | 1.2 | 0.3 | 0.4 | 0.5 | 0.5 | 0.7 |
| Appearance | O | O | O | O | x | x | x | x | x |

A: Amount of multiple functional monomer added (part by weight)
B: Amount of electron beam radiation (Mrad)

Corporation. The measurements were effectuated at 160° C. in accordance with the procedure outlined in JIS K6767.

Several samples of the plastic foam material with varying average areas of the dispersion phase were obtained. The varying average areas of the dispersion phase was calculated in response to addition of varying amount of cross-linking agents and irradiation with varying dosage of the electron beam. The aforementioned samples were measured to determine the percentage of elongation, if any, at 160° C. The value representing percentage of elongation was then plotted against the corresponding average areas of dispersion phase of the respective samples.

It is abundantly clear from FIG. 1, that percentage of elongation was high, i.e., at about 300 to 400 percent, when the average area of the dispersion phase was smaller than 3 μm². Alternatively, the percent change in elongation was small, i.e., 100 percent when the average area of dispersion phase exceeded 3 μm².

A top surface of the thus obtained sheet of a polyolefin based resin was pre-treated by corona discharge. With the aid of a polyester based adhesive, the pre-treated surface was glued to a commercially available impact-resistant mixed resin sheet (skin material) to form a layered structure. The outer layer measured about 0.65 mm in thickness and was composed of at least one of polyvinyl chloride resin and acrylonitrile-butadiene-styrene copolymerized (ABS) resin.

Thereafter, the layered structure was vacuum molded, followed by inspection of the thus obtained layered structure. The step before vacuum molding involved heating the layered structure containing the plastic foam material by an infra-red heater until its surface temperature reaches 150° C. to 160° C.

To determine the moldability of the layered structure, the layered structure was vacuum molded in a mold having a cylindrical indentation measuring 100 mm in diameter and 150 mm deep. The maximum depth (H) of the molded cylindrical body (without its rupture) was measured along with a diameter (D) of the cylindrical body. The ratio H/D was calculated and used to evaluate the vacuum moldability.

A high H/D value indicates that the layered structure exhibits superior vacuum moldability.

Thereafter, the molded cylindrical body was inspected visually for appearance of deformities, if any, on its surface. The results of the visual inspection are reported in Table 19. An "o" indicates the lack of any deformities on the surface of the layered structure, while an "x" indicates the opposite.

EXAMPLES 22–24 AND COMPARISON EXAMPLES 20–24

To form a plastic foam material and a layered structure composed of the same material, for this experiment, a polyolefin based resin composition containing the various components in accordance with Table 19 were mixed.

For this example, a polyolefin based resin composition together with a cross-linked, polyolefin based resin sheet, a plastic foam material and a layered structure containing the plastic foam material were formed in accordance with the procedure outlined in example 21. The specified contents of the various components are illustrated in Table 19, together with the dosage of the electron beam.

The gel fraction, the resin dispersion condition of the plastic foam material were measured in accordance with the procedure outlined in example 21.

In determining the dispersion of the polyethylene resin dispersed in the polypropylene resin matrix of the plastic foam material, the average dispersion phase area was measured when polyethylene was the dispersion phase. The appearance and the vacuum moldability of the layered body were also evaluated using the same procedure described in example 21. All the results obtained are shown in Table 19.

It seems clear that the layered structures composed of the plastic foam material according to examples 20–24 are superior in appearance and exhibit improved vacuum moldability as indicated by a specified H/D value which is larger than 1.0, while the plastic foam material produced in accordance with comparison examples 20–24 exhibited a poor appearance and inferior vacuum moldability wherein H/D value are smaller than 0.5.

Other alternatives would fall within the scope of the invention. For example, any process which permits cross linking to be substantially completed before activating the foaming action should be considered part of the present invention. That is, for example, another process than thermodecomposition may be employed to trigger foaming. In one alternative, cross linking and foaming may be accomplished by the same stimulus, and beginning at the same time, but at different rates. That is, cross linking is substantially completed before foaming is well advanced.

Having described preferred embodiments of the invention, it is to be understood that the invention is not limited to those precise embodiments, and that various changes and modifications may be effected therein by one skilled in the art without departing from the scope or spirit of the invention as defined in the appended claims.

What is claimed is:

1. A plastic foam material composed of an polyolefin based resin composition comprising, in weight percent:

from about 40 to about 95 weight percent of polypropylene based resins;

said polypropylene based resin includes a molecular weight of from about $2.5 \times 10^5$ to about $6.0 \times 10^5$ s;

from about 5 to about 60 weight percent of polyethylene based resins;

said plastic foam material further including from about 20 to about 65 weight percent of a cross linked portion; and said cross linked portion includes from about 55 to about 95 weight percent of a cross linked polypropylene and from about 5 to about 45 weight percent of cross linked polyethylene.

2. The plastic foam material according to claim 1, wherein said polypropylene based resin further includes at least one member selected from the group consisting of a polypropylene and a copolymer of propylene and an α-olefin other than propylene.

3. The plastic foam material according to claim 1, wherein said polypropylene based resin includes a melt index (MI) of from 0.5 g/10 minutes to about 12 g/10 minutes.

4. The plastic foam material according to claim 1, wherein said polypropylene based resin further includes an antioxidant.

5. The plastic foam material according to claim 1, wherein a relative extent of polypropylene cross linking to polyethylene cross linking in said cross linked portion, in weight percent, is expressed by the following ratio:

$$(W_1/W_2)/(W_3/W_4),$$

where $W_1$ is the weight of a cross linked portion of said polypropylene;

$W_2$ is the weight of a cross-linked portion of said polyethylene;

$W_3$ is the weight of said polypropylene based resin;

$W_4$ is the weight of said polyethylene based resin; and said ratio is from about 1 to about 5.

6. The plastic foam material according to claim 1, further includes a swelling ratio of from about 30 to about 80, wherein said swelling ratio is expressed as:

$$\text{Swelling ratio} = \frac{W_5}{W_6}$$

where $W_5$=Weight of wet residue after xylene extraction at 120° C. for 24 hours, and $W_6$=Weight of dried residue after xylene extraction at 120° C. for 24 hours followed by drying at 80° C. and 10 mm Hg pressure for 5 hours.

7. The plastic foam material according to claim 1, further includes a continuous phase polypropylene based resin matrix having a dispersion phase polyethylene based resin dispersed in said continuous phase.

8. The plastic foam material according to claim 7, wherein said dispersed phase has an average cross sectional area of no more than 4.0 µ²m.

9. The plastic foam material according to claim 1, wherein said polyethylene based resin having an apparent density ranging from about 0.02 to about 0.2 g/cm³.

10. The plastic foam material according to claim 1, wherein said polyethylene based resin further includes at least one member selected from the group consisting of polyethylene, a copolymer of ethylene and an α-olefin other than ethylene, a copolymer of ethylene and an acrylic acid, a copolymer of ethylene and a methacrylic acid, a copolymer of ethylene and a low molecular weight alkyl ester of an acrylic acid, a copolymer of ethylene and a low molecular weight alkyl ester of a methacrylic acid, and a copolymer of ethylene and vinyl acetate.

11. The plastic foam material according to claim 1, wherein said polyethylene based resin includes a melt index (MI) of from about 2 g/10 minutes to about 50 g/10 minutes.

12. The plastic foam material according to claim 1, wherein a melt shear viscosity of said polyethylene based resin ($\mu_2$) being from about 2,000 to about 10,000 poises at a temperature of about 180° to about 220° C. at a shear rate of from about 80 to about 800 per second.

13. The plastic foam material according to claim 1, wherein a melt shear viscosity of said polypropylene based resin ($\mu_1$) being from about 4,000 to about 30,000 poises at a temperature of about 180° to about 220° C. at a shear rate of from about 80 to about 800 per second.

14. The plastic foam material according to claim 1 further includes a cross-linking agent.

15. The plastic foam material according to claim 1 further includes a thermodecomposition foaming agent.

16. The plastic foam material according to claim 14, wherein said cross-linking agent further includes at least one member selected from the group consisting of divinyl benzene, ethyl vinyl benzene, trimethylol propane triacrylate, 1,6-hexanediol diacrylate, 1,9-nonanediol diacrylate, 1,10-decanediol diacrylate, trimethylol propane trimethacrylate, 1,6-hexanediol dimethacrylate, 1,9-nonanediol dimethacrylate, 1,10-decanediol dimethacrylate, 1,2,4-triallyl trimellitate, and triallyl isocyanurate.

17. The plastic foam material according to claim 16, wherein said cross-linking agent is a multi-functional monomer; and said multifunctional monomer includes at least two members selected from the group consisting of vinyl, acryloyl, methacryloyl, and allyl compounds.

18. The plastic foam material according to claim 15, wherein said foaming agent is an azodicarbonamide compound.

19. The plastic foam material according to claim 18, wherein said azodicarbonamide is at least one member selected from the group consisting of 1,1-azobisformamide, benzene sulfonyl hydrazide, dinitrosopentamethylene tetramine, toluene sulfonyl hydrazide, and 4,4-oxybis(benzene sulfonyl hydrazide).

20. A plastic foam material composed of an polyolefin based resin composition comprising:

from about 40 to about 95-weight percent of polypropylene based resin containing from about 2 to about 15 weight percent of ethylene;

said polypropylene based resin includes a molecular weight of from about $2.5 \times 10^5$ to about $6.0 \times 10^5$;

from about 5 to about 60 weight percent of a polyethylene based resin;

said plastic foam material further includes from about 20 to about 65 weight percent of a cross linked portion;

said cross linked portion consists of from about 55 to about 95 weight percent of a cross linked polypropylene and from about 5 to about 45 weight percent of cross linked polyethylene.

21. A method for preparing a plastic foam material comprising the steps of:

mixing from about 40 to about 95 weight percent of polypropylene based resins and from about 5 to about 60 weight percent of a polyethylene based resins together with a cross-linking agent and a foaming agent to form a resin composition;

said polypropylene based resin includes a molecular weight of from about $2.5 \times 10^5$ to about $6.0 \times 10^5$;

extruding said resin composition to form a resin sheet:

exposing said sheet to an ionizing radiation source to form a cross-linked resin sheet; and heating said cross-linked resin sheet to form a plastic foam material.

22. The method of claim 21, wherein said ionizing radiation source includes electron beam radiation.

23. The method of claim 21, wherein a dosage of said ionizing radiation source is from 0.5 to 20 Mrad.

24. The method of claim 23, wherein said dosage is from 1.0 to 6.0 Mrad.

25. The method of claim 21, wherein said step of irradiating said sheet includes exposing said sheet to a radiation source including at least one of α-ray, β-ray, γ-ray and electron beam radiation.

26. The method of claim 21, wherein said foaming agent is organic and is capable of thermodecomposition.

27. The method of claim 26, wherein said foaming agent is an azodicarbonamide compound.

28. The method of claim 27, wherein said azodicarbonamide is at least one selected from the group consisting of 1,1-azobisformamide, benzene sulfonyl hydrazide, dinitrosopentamethylene tetramine, toluene sulfonyl hydrazide, 4,4-oxybis(benzene sulfonyl hydrazide), and similar compounds.

29. The method of claim 21 wherein said cross-linking agent further includes at least one member selected from the group consisting of divinyl benzene, ethyl vinyl benzene, trimethylol propane triacrylate, 1,6-hexanediol diacrylate, 1,9-nonanediol diacrylate, 1,10-decanediol diacrylate, trimethylol propane trimethacrylate, 1,6-hexanediol dimethacrylate, 1,9-nonanediol dimethacrylate, 1,10-decanediol dimethacrylate, 1,2,4-triallyl trimellitate, and triallyl isocyanurate.

30. The method of claim 21 wherein said cross-linking agent is a multi-functional monomer, wherein said multi-functional monomer is at least two members selected from the group consisting of vinyl, acryloyl, methacryloyl, and allyl compounds.

31. The method of claim 21 wherein said multifunctional monomer is at least one member selected from the group consisting of divinyl benzene, trimethylol propane triacrylate, 1,6-hexanediol diacrylate, 1,9-nonanediol diacrylate, 1,10-decanediol diacrylate, trimethylol propane trimethacrylate, 1,6-hexanediol dimethacrylate, 1,9-nonanediol dimethacrylate, 1,10-decanediol dimethacrylate, triallyl trimellitate, triethylene glycol diacrylate, tetraethylene glycol diacrylate, cyanoethyl acrylate, and bis(4-acryloxy polyethoxy phenyl) propane.

32. The method of claim 21, wherein said step of heating includes heating in a vertical air blown oven.

33. The method of claim 21, wherein said step of extrusion includes continuously drawing to form a continuous sheet.

34. The method of claim 21, wherein said polypropylene based resin has a melt index of from 0.5 g/10 minutes to about 12 g/10 minutes.

35. The method of claim 21, wherein said polyethylene based resin has a melt index of from about 2 g/10 minutes to about 50 g/10 minutes.

36. The method of claim 21, wherein said polypropylene based resin further includes an antioxidant.

37. The method of claim 21, wherein said polypropylene based resin has an averaged molecular weight of from about $2.5 \times 10^5$ to about $6.0 \times 10^5$.

38. The method of claim 21, wherein a relative extent of polypropylene cross linking to polyethylene cross linking in said cross linked portion, in weight percent, is expressed by the following ratio:

$$(W_1/W_2)/(W_3/W_4),$$

where $W_1$ is the weight of a cross linked portion of said polypropylene;

$W_2$ is the weight of a cross-linked portion of said polyethylene;

$W_3$ is the weight of said polypropylene based resin;

$W_4$ is the weight of said polyethylene based resin; and said ratio is from about 1 to about 5.

39. The method of claim 21, further includes a swelling ratio of from about 30 to about 80, wherein said swelling ratio is expressed as:

$$\text{Swelling ratio} = \frac{W_5}{W_6}$$

where $W_5$ = Weight of wet residue after xylene extraction at 120° C. for 24 hours, and $W_6$ = Weight of dried residue after xylene extraction at 120° C. for 24 hours followed by drying at 80° C. and 10 mm Hg pressure for 5 hours.

40. The method of claim 21, wherein said polyethylene based resin further includes at least one member selected from the group consisting of polyethylene, a copolymer of ethylene and an α-olefin other than ethylene, a copolymer of ethylene and an acrylic acid, a copolymer of ethylene and a methacrylic acid, a copolymer of ethylene and a low molecular weight alkyl ester of an acrylic acid, a copolymer of ethylene and a low molecular weight alkyl ester of a methacrylic acid, and a copolymer of ethylene and vinyl acetate.

41. The method of claim 21, wherein said polypropylene based resin further includes at least one member selected from the group consisting of a polypropylene and a copolymer of propylene and an α-olefin other than propylene.

42. A method for preparing a plastic foam material composed of a polyolefin based resin composition, comprising the steps of:

mixing from about 40 to about 95 weight percent of polypropylene based resins containing from about 2 to about 15 weight percent of ethylene and from about 5 to about 60 weight percent of a polyethylene based resins together with a cross-linking agent and a foaming agent to form a resin composition;

extruding said resin composition to form a resin sheet:

exposing said sheet to an ionizing radiation source to form a cross-linked resin sheet;

wherein said step of exposing said sheet to an ionizing radiation source includes ionizing said sheet to an ionizing dosage, wherein said ionizing dosage satisfies the formula:

$$2 < A + B < 20$$

where,

A = Amount, in parts by weight, of multi-functional monomer per 100 parts by weight of polyolefin based resin; and B = Dosage (Mrad) of ionizing radiation; and heating said cross-linked resin sheet to form a plastic foam material.

43. A method for forming a foamed resin, comprising:

forming a mass of an un-crosslinked resin containing a foaming agent;

cross-linking said resin in said mass, without activating said foaming agent; and after the step of cross-linking, activating said foaming agent to produce said foamed resin.

44. A plastic foam material comprising, in weight percent:

at least one polypropylene based resin;

said at least one polypropylene based resin including a melt index from about 0.05 to about 12 g/10 min;

at least one polyethylene based resin;

said at least one polyethylene based resin including a melt index from about 2 to about 50 g/10 min;

said plastic foam material further including from about 20 to about 65 weight percent of a cross linked portion; and said cross linked portion consists includes from about 55 to about 95 weight percent of a cross linked polypropylene and from about 5 to about 45 weight percent of cross linked polyethylene.

45. The plastic foam material according to claim 1, further including a melt shear viscosity ratio of from about 0.3 to about 4.0, wherein said melt shear viscosity ratio is expressed as:

$$(\mu_1)/(\mu_2)$$

where $(\mu_1)$=The melt shear viscosity of the polypropylene based resin $(\mu_2)$=The melt shear viscosity of the polyethylene.

46. The method of claim 44, wherein said ionizing dosage satisfies the formula:

$$3<A+B<10$$

where,

A=Amount, in parts by weight, of multi-functional monomer per 100 parts by weight of polyolefin based resin; and B=Dosage (Mrad) of ionizing radiation.

47. The method of claim 42, wherein said cross-linking agent includes a multi-functional monomer.

48. The method of claim 47, wherein said multi-functional monomer includes at least two members selected from the group consisting of a vinyl group, an acryloyl group, a methacryloyl group, and an allyl group.

49. The method of claim 44, wherein said multi-functional monomer includes at least one member selected from the group consisting of divinyl benzene, trimethylol propane triacrylate, 1,6-hexanediol diacrylate, 1,9-nonanediol diacrylate, 1,10-decanediol diacrylate, trimethylol propane trimethacrylate, 1,6-hexanediol dimethacrylate, 1,9-nonanediol dimethacrylate, 1,10-decanediol dimethacrylate, 1,2,4-triallyl trimellitate, triethylene glycol diacrylate, tetraethylene glycol diacrylate, cyanoethyl acrylate, bis(4-acryloxy polyethoxy phenyl) propane, triallyl isocyanurate and similar compounds.

50. The method of claim 45, wherein:

said melt index of said polypropylene based resin being from about 0.3 to about 8 g/10 minutes; and said melt index of said polypethylene based resin being from about 3 to about 30 g/10 minutes.

51. The method of claim 21, wherein:

said melt index of said polypropylene based resin being from about 0.3 to about 8 g/10 minutes; and said melt index of said polypethylene based resin being from about 3 to about 30 g/10 minutes.

52. The plastic foam material according to claim 1, wherein:

said melt index of said polypropylene based resin being from about 0.3 to about 8 g/10 minutes; and said melt index of said polypethylene based resin being from about 3 to about 30 g/10 minutes.

53. The plastic foam material according to claim 1, wherein said polypropylene includes a molecular weight of from about $3.0 \times 10^5$ to about $5.0 \times 10^5$.

54. The plastic foam material according to claim 20, wherein said polypropylene includes a molecular weight of from about $3.0 \times 10^5$ to about $5.0 \times 10^5$.

* * * * *